INVENTORS
BRITTON CHANCE
EDWARD F. MAC NICHOL, JR.

Jan. 11, 1955    B. CHANCE ET AL    2,699,546
RANGE MEASURING APPARATUS FOR RADIO ECHO DETECTION SYSTEM
Filed Nov. 29, 1945    3 Sheets-Sheet 3

INVENTORS
BRITTON CHANCE
EDWARD F. MAC NICHOL, JR.

BY *M. O. Hayes*

ATTORNEY

United States Patent Office 2,699,546
Patented Jan. 11, 1955

2,699,546

RANGE MEASURING APPARATUS FOR RADIO ECHO DETECTION SYSTEM

Britton Chance, Cambridge, and Edward F. MacNichol, Jr., Hamilton, Mass., assignors, by mesne assignments, to the United States of America as represented by the Secretary of the Navy Application November 29, 1945, Serial No. 631,744

7 Claims. (Cl. 343—13)

Our present invention relates in general to apparatus for measuring range in a radio echo detection system and more particularly to an improved range measuring apparatus of the high precision type.

In radio echo detection systems, a radio transmitter is caused to transmit a pulse of radio energy. Objects lying in the path of this transmitted pulse may reflect some of the energy as a reflected pulse. The receiver associated with the system will thereupon receive the reflected energy and present information accordingly to an indicator system. The usual and normal indicator system used with radio echo detection systems comprises a cathode ray tube having the end of its beam swept across or around the face or screen of the tube at a linear rate of speed. An excursion of the beam starts with the transmission of a radio energy pulse and when an echo is received in the receiver a deflection of the beam transverse to the direction of the aforementioned excursion is caused. The distance between the start of an excursion and the deflection or pip in the beam indicates the range of the reflecting target inasmuch as the time taken for the radio energy to go out and come back is a measure of the distance to the target.

In the normal indicator an excursion of the beam of the cathode ray tube will encompass a relatively large range region. Therefore a single pip or deflection of the cathode ray beam will be rather narrow and small. This renders precision work difficult. However if the portion of the excursion path containing the echo from an object of interest can be expanded so that it may be viewed in greater detail, then precision ranging is possible. Our invention is directed to providing an improved system for solving the problem of expanding that portion of the main indicator sweep which contains targets of immediate interest.

It is therefore an object of our invention to provide in a range measuring equipment for a radio echo detection system means for expanding any desired portion of the normal sweep.

It it a further object of our invention to provide such sweep expanding means that will permit precision ranging on any desired target lying on the major sweep.

It is a still further object of our invention to provide a circular sweep in such range expanding equipment.

It is a still further object of our invention to provide in such precision ranging equipment a numerical counter that will permit the direct reading of range to the target being measured.

It is a still further object of our invention to provide such precision ranging equipment that will permit the expanded portion of the range being examined to be changed at will with respect to the full range region shown on the normal sweep.

Other objects and features of our present invention will become apparent upon a careful consideration of the following detailed description when taken together with the accompanying drawings, the figures of which illustrate a typical embodiment of the invention.

Figure 1:
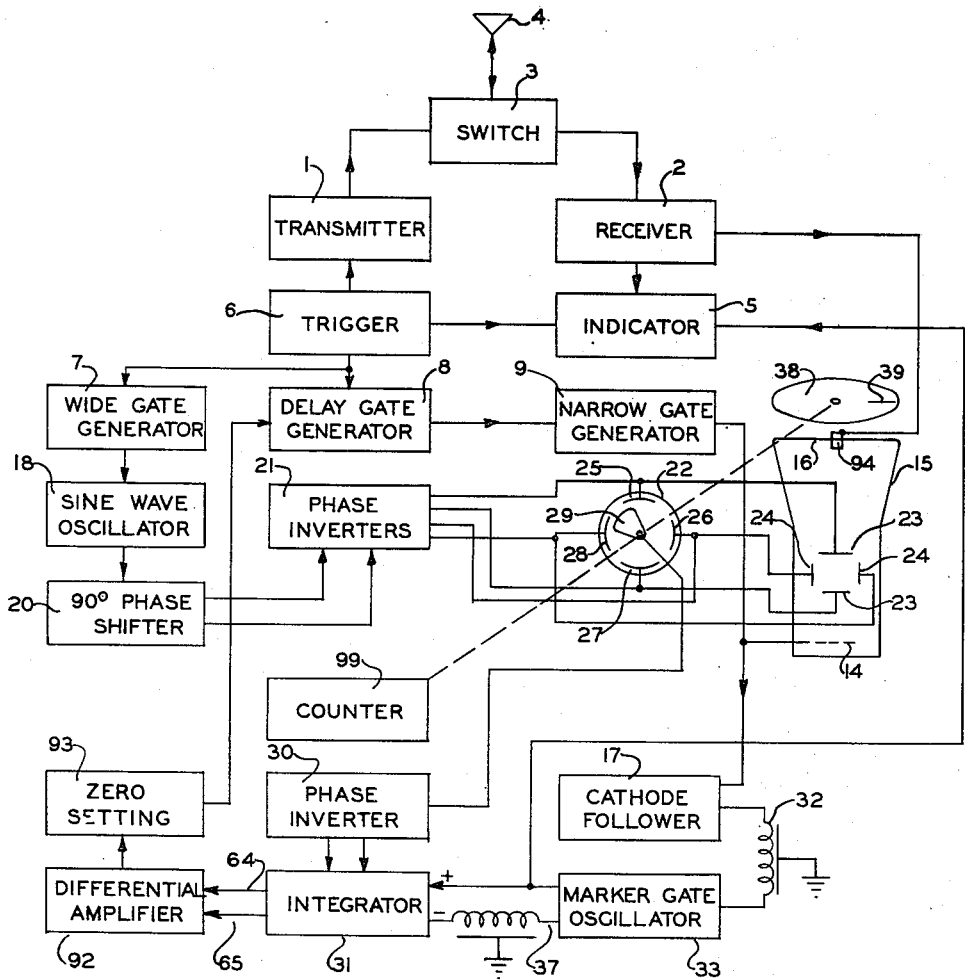
Fig. 1 illustrates in block diagram form a radio echo detection system having incorporated therewith precision range measuring apparatus of our invention.

In Fig. 1 a radio echo detection system comprising a transmitter 1, a receiver 2, associated switching apparatus 3 and an antenna 4 has an indicator 5 for presenting information furnished thereby. This is the normal cathode ray tube indicator described above for radio echo detection systems. Triggering apparatus 6 causes the transmitter 1 to emit a pulse of radio frequency energy while at the same time initiating the operation of other auxiliary circuits of the apparatus of our invention as will be explained hereinbelow. The radio echo detection system functions in the usual and normal manner of such systems. The switch 3 is preferably an electronic switch provided for the purpose of permitting the use of a common antenna 4 for both transmission and reception, all in a known and usual fashion. The indicator 5 will present information about targets lying in the region about the radio echo detection system and has upon it usually a sweep that covers the entire operating range of the said radio echo detection system.

Figure 2:
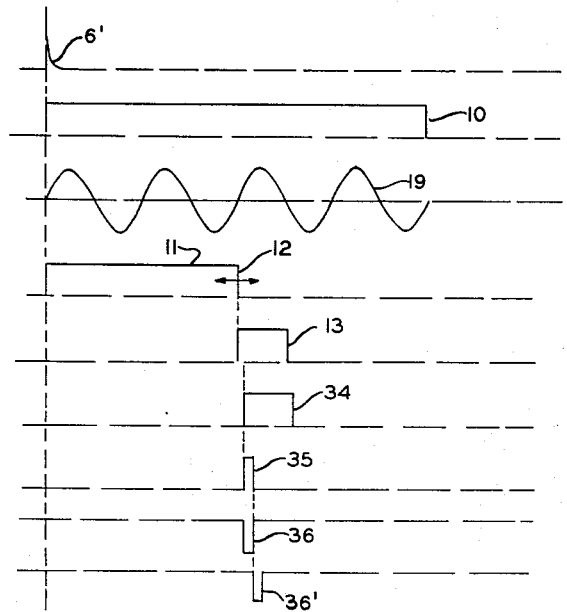
Fig. 2 illustrates the time relationship existing instantaneously between various voltage waves in the apparatus of Fig. 1.

The apparatus of our invention comprises a circuit now to be described. Various voltage waves and pulses produced by this apparatus are illustrated in Fig. 2. The aforementioned trigger apparatus 6 produces a trigger pulse 6′ which causes a wide gate generator 7 and a delay gate generator 8 to commence operation simultaneously. The wide gate generator 7 produces a rectangular pulse 10, which lasts for a time equivalent to the total operating range of the aforementioned radio echo detection system. The delay gate generator produces a rectangular pulse 11 having a variable trailing edge 12. The trailing edge 12 of the rectangular pulse 11 produced by the delay gate generator 8 initiates the action of a narrow gate generator 9 which produces a rectangular pulse 13 of relatively very short duration. The rectangular pulse 13 may have a duration of, for example, 12.3 microseconds, which is equivalent to 1 mile of range in a radio echo detection system. The narrow gate generator 9 is connected at its output to the intensifying grid 14 of a cathode ray tube 15. The short rectangular pulse 13 will cause the electron beam of the said cathode ray tube 15 to illuminate the screen 16 of the cathode ray tube when applied to the grid 14. The short rectangular pulse 13 is also applied to a cathode follower circuit 17 for a purpose to be hereinafter described.

Simultaneouly with the hereinabove described action, a sine wave oscillator 18 is caused to oscillate at a predetermined frequency by the wide gate generator 7. The relatively long rectangular pulse 10 produced by the wide gate generator 7 triggers the sine wave oscillator 18 into action and maintains that oscillator in action for the duration of the long rectangular pulse 10. The output of the sine wave oscillator 18 is a sine wave having a predetermined and fixed frequency that is determined from the amount of range to be presented on the scope 15 by the narrow gate pulse generator 9. Desirably, if the narrow gate generator 9 generates a pulse 13 of 12.3 microseconds duration the frequency of the sine wave 19 should be substantially 82 kc. With this choice of frequency a sweep will be produced on the screen 16 of the cathode ray tube 15 having a range duration of 1 mile, thereby corresponding to an illumination time equivalent to 1 mile. The exact manner in which the aforementioned sweep is produced will appear hereinbelow.

The sine wave output 19 of the oscillator 18 is split into two sine waves having a phase difference of 90° in a phase shifter 20. The two output sine wave voltages of the phase shifter 20 are further fed to a pair of phase inverters 21, each of which splits the signal fed to it into two sinusoidal voltages having a phase difference of 180°. The phase inverters 21 therefore will produce four sinusoidal voltages each differing from and leading its next succeeding neighbor by a phase difference of substantially 90°. Thus the output of the phase inverters 21 is a symmetrical four-phase sinusoidal voltage. That is, the four phases are symmetrically arranged each 90° apart from its nearest neighbor, and leading one and lagging the other of said neighbors.

The symmetrical four-phase sinusoidal voltage output of the phase inverters 21 is fed in parallel to a phase-shifting capacitor 22 and to the deflection plates 23, 24 of the cathode ray tube 15. Considering first the deflection plates of the cathode ray tube 15, one pair of the four phase sinusoidal voltages which are 180° apart are fed to the two vertical deflection plates 23 of the cathode ray tube 15. Similarly the second and remaining pair of sinusoidal voltages, which also are 180° apart but each shifted by 90° from either of the first pair, are applied to the horizontal deflection plates 24 of the cathode ray tube 15. Thus the four deflection plates 23 and 24 of the cathode ray tube 15 have upon them a set of sinusoidal voltages in symmetrical phase quadrature. Voltages so arranged will cause the electron beam of the cathode ray tube 15 to sweep in a circular path over the screen 16 of that cathode ray tube, thereupon producing a circular sweep. One sweep will be produced for each oscillation of the output 19 of the sine wave oscillator 18. If the frequency of this output 19 is substantially 81.97 kc., the range region covered by one full circular sweep will be 1 mile.

The phase shifting capacitor 22 comprises four sets of stator plates 25, 26, 27 and 28 respectively and one set of rotor plates 29. The sets of stator plates are arranged symmetrically in a circle and a single set of rotor plates 29 is arranged rotatably in the center of that circle. In the same manner as it was connected to the four deflection plates 23, and 24 of the cathode ray tube 15, the symmetrical four phase output voltage of the phase inverter 21 is fed in symmetrical phase quadrature fashion to the four sets of stator plates 25, 26, 27 and 28, so that each set of stator plates has upon it a sinusoidal voltage differing by 90° in phase from the voltage on each of the neighboring sets of plates, and leading the voltage on one neighboring set and lagging the voltage on the opposite neighboring set. The rotor plates 29 will have upon them a sinusoidal voltage having a phase with respect to the output 19 of the sine wave oscillator 18, which is determined by the orientation of that set of rotor plates 29 with respect to the four sets of stator plates. Thus, the voltage on the rotor plates 29 is constantly variable in phase as those rotor plates are rotated within the phase shifting capacitor 22. This variable phase sine wave voltage on the plates 29 is fed to a phase inverter circuit 30.

The phase inverter circuit 30 produces two sine wave voltage waves 180° out of phase with each other but having substantially the same peak to peak amplitude in the same manner as the phase inverters 21. These two sine wave voltages although 180° out of phase with respect to each other are variable in phase with respect to the output 19 of the sine wave oscillator 18, in accordance with the rotation of the rotatable plate 29 of the phase shifting capacitor 22 as hereinabove mentioned. The phase inverter 30 is connected to an integrator circuit 31, the two sine wave signals produced by the phase inverter 30 being fed into two grids within that integrator circuit 31 and operating in a manner that will be hereinafter explained in greater detail.

We now return to the cathode follower circuit 17, which it will be recalled has impressed upon it the narrow gate voltage 13 generated by the narrow gate generator 9. The cathode follower circuit 17 functions as an impedance changer and feeds its output, which is a narrow pulse corresponding to the narrow pulse 13, to a delay line 32 which desirably delays the narrow pulse 13 by a fixed amount. A desirable amount of delay may be 3 microseconds and has a purpose, as will appear hereinbelow. This amount of delay, however, may be varied, if desired. As a result of the delay in the delay line 32, the narrow rectangular pulse 13 now occurs later and may be considered to be a different pulse 34, as illustrated in Fig. 2.

The delayed narrow rectangular pulse 34 is further fed to a marker gate oscillator 33 which when triggered by the delayed narrow rectangular pulse 34 produces two relatively extremely narrow marker pulses 35 and 36, one being positive and the other being negative in polarity. These extremely narrow marker pulses 35 and 36 are desirably of the order of 0.3 microsecond in duration. The positive marker pulse 35 is fed to the main radio echo system indicator 5 and produces thereon an indication, that, as will be explained later, indicates the time or position of start of the sweep of the auxiliary indicator system of my invention with respect to the major sweep of the complete radio echo detection system. The two positive and negative marker pulses 35 and 36 are also fed to the integrator circuit 31. However, the negative marker pulse 36 is delayed in a delay line 37 by a time equal to the length of a marker pulse, namely, by a time substantially equal to 0.3 microsecond in the present example, and it is a delayed negative marker pulse 36' that is fed to the integrator 31.

The integrator circuit 31 produces a signal which is the difference between two voltages. The signal is used to synchronize the narrow gate generator 9 with the position of a desired target on the indicator 5. The output of the integrator circuit 31 is fed to a differential amplifier 92. The output of this differential amplifier 92 is a directional voltage proportional to the difference in the two voltages of the output of the integrator 31, and is fed to the delay gate generator 8, where it is operative to vary the time of termination of the output pulse 11 of that generator 8. That is, the duration of the pulse 11 or the time of occurrence of its trailing edge 12 is varied by the output signal of the differential amplifier 92. A zero setting device 93 may be hand operative to fix the time of duration of the pulse 11 of the delay gate generator 8 at a predetermined value.

Echoes from the receiver 2 are fed to the indicator 5 and also to the cathode ray tube 15, being connected thereto by means of a centrally disposed electrode 94. Thus, the sweep of the cathode ray tube 15 being circular, echoes introduced by way of the electrode 94 will cause radial deflection of that sweep. A transparent or otherwise light transmitting disc 38 is rotatably mounted concentrically with the centrally disposed electrodes 94 and has upon it a fiduciary mark 39. The disc 38 is connected by means of a common shaft illustrated as a dotted line with the set of rotatable plates 29 of the phase shifting capacitor 22 and further connected by means of the same shaft to a counting device 99. When the equipment is operated, the fiduciary mark 39 is lined up or compared with the position of an echo pulse shown on the circular sweep of the cathode ray tube 15 and the range of that pulse is read on the counter 99.

The operation of the apparatus of Fig. 1 will now be explained in greater detail. As will be readily appreciated, the cathode ray tube 15 will present a visible circular sweep only when the narrow rectangular pulse 13 produced by the narrow gate generator 9, exists at the intensifier grid 14 of that tube 15. Since the sine wave oscillator 18 produces a continuous series of oscillations 19, it does not matter at what instant of time the beam of the cathode ray tube 15 becomes illuminated, for at any instant, some instantaneous portion of a set of sine waves in symmetrical phase quadrature will be on the deflection plates 23, and 24. Therefore, for the time duration of the narrow rectangular pulse 13, a single sine wave will occur on each of the deflection plates, as aforementioned. Therefore, for the duration of the narrow rectangular pulse 13, namely for the time that the tube 15 is illuminated, a single circular sweep having a total range of substantially one mile will occur. Further, this circular sweep of one mile range will occur sometime subsequent to the initiation of the main sweep of the indicator 5. The exact time when the circular sweep on the cathode ray tube 15 occurs will be determined by the instant of occurrence of the trailing edge 12 of the pulse 11 of the delay gate generator 8. The occurrence of this trailing edge 12 is controlled by the position of the rotatable plates 29 of the phase shifting capacitor 22.

In order to understand how the rotatable plates 29 of the phase shifting capacitor 22 will control the instant of occurrence of the trailing edges 12 aforementioned, it is necessary to explain in greater detail the circuit of the integrator 31 and further to explain in some detail the circuit of an appropriate delay gate generator 8.

Figure 4:
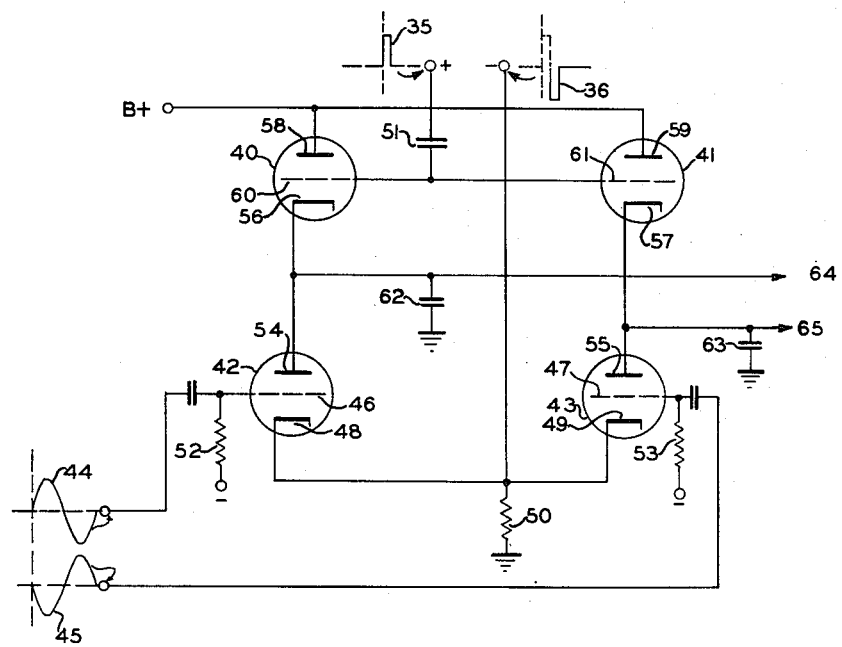
Fig. 4 illustrates the circuit of the integrator of the apparatus of Fig. 1.

In Fig. 4 there is illustrated a suitable circuit for the integrator 31. This circuit comprises four electron tubes 40, 41, and 42 and 43. The output of the phase inverter 30 comprising two sine waves 44 and 45 mutually 180° out of phase is brought to the control grids of the two lower electron tubes 42 and 43. Thus one sine wave voltage 44 is brought to the grid 46 of the left-hand electron tube 42, whereas the opposing sine wave voltage 45 is brought to the grid 47 of the right-hand electron tube 43. As hereinabove set forth these two sine wave voltages 44 and 45 are further controllable in phase with respect to the output 19 of the sine wave oscillator 18, by the position of the rotatable plates 29 of the phase shifting capacitor 22.

The cathodes 48 and 49 of the two lower electron tubes 42 and 43 respectively are connected together and grounded through a resistor 50. The grids 46 and 47 are each connected to a source of negative potential through resistors 52 and 53 respectively. The negative potential should be desirably sufficiently great to maintain the two electron tubes 42 and 43 non-conductive in the quiescent state. The anodes 54 and 55 of the two lower electron tubes 42 and 43 respectively are each connected to a cathode 56 or 57 respetively of one of the upper electron tubes 40 or 41 respectively. These two upper electron tubes 40 and 41 ar inserted between the anodes 54 and 55 of the lower electron tubes 42 and 43 and a source of positive voltages B+, and act as switch tubes which are non-conductng in the quiescent state. The anodes 58 and 59 of the two switch tubes 40 and 41, respectively, are connected in parallel to this source of positive anode voltage B+. The grids 60 and 61 of these two switch tubes 40 and 41 respectively have no potential upon them in the normal state. Since the switch tubes 40 and 41 do not conduct in the quiescent state, the anodes 54 and 55 of the electron tubes 42 and 43 respectively have no potential upon them in the quiescent state. The lower electron tubes 42 and 43, therefore, remain non-conducting when there is no anode voltage applied to these tubes. Associated with each anode 54 and 55 of the lower electron tubes 42 and 43 are capacitors 62 and 63 respectively. These capacitors 62 and 63 are charging capacitors in the output circuit of the integrator. The two marker pulses 35 and 36' are brought into the circuit of the integrator through suitable leads. The positive pulse 35 is fed through a capacitor 51 to the two grids 60 and 61 of the switch tubes 40 and 41 in parallel. The negative marker pulse 36' is brought directly to the two cathodes 48 and 49 of the two lower electron tubes 42 and 43 respectively in parallel.

The operation of the integrator circuit will now be explained. As aforementioned, the two 180° out of phase sine waves 44 and 45 are at all times during the operation of the apparatus present upon the control grids 46 and 47 of the lower electron tubes 42 and 43 respectively. Upon the occurrence of a positive marker pulse 35 the grids 60 and 61 of the switch tubes 40 and 41 respectively are made sufficiently positive to cause those two switch tubes to become conductive. Thereupon positive voltage from the B+ supply is applied to the anodes 54 and 55 of the two lower electron tubes 42 and 43 respectively, simultaneously placing a charge upon each of the capacitors 62 and 63. The two capacitors 62 and 63 are charged to the same extent during the occurrence of a positive marker pulse 35. Immediately upon the cessation of the positive marker pulse 35, a negative marker pulse 36' commences and is applied to the cathodes 48 and 49 of the two lower electron tubes 42 and 43 in parallel. This negative marker pulse voltage is sufficiently great in a negative fashion to render the two lower electron tubes 42 and 43 conductive, and therefore to commence discharge of the two capacitors 62 and 63 respectively. However, as will be recalled, there is present upon each of the grids 46 and 47 respectively of the two lower electron tubes 42 and 43 a sine wave voltage 44 and 45 respectively, and further, these sine wave voltages are 180° out of phase with respect to each other. Therefore, at the instant of application of the negative pulse 36', one lower electron tube 42, or 43, namely the one having the positive half cycle of its sine wave 44 or 45 on its control grid 46 or 47 will be more conductive than the other of said electron tubes. As a consequence, one of the capacitors 62 or 63 will be discharged to a greater extent than the other of said capacitors, and there will be a voltage difference existing between the charged plate of these two capacitors upon the termination of the negative marker pulse 36'. This voltage difference is brought out of the integrator by means of terminals 64 and 65 as the output signal. It is this output signal that is fed to the differential amplifier 92 to be amplified and thereafter to be applied to the gate generator 8.

Figure 5:
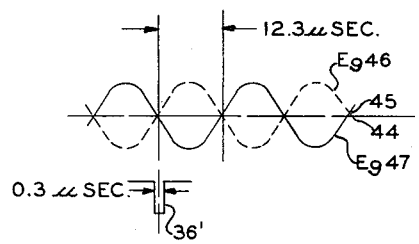
Fig. 5 illustrates the relationship that exists between certain voltage waves in the apparatus of Fig. 4 in order that the apparatus of Fig. 1 may function properly.

Reference to Fig. 5 will illustrate that at one point and substantially only that point on the graph representing the two sine waves 44 and 45 will be voltages on the two grids, $E_{g46}$ and $E_{g47}$, respectively, be at any instant equal. This is the instant when the two sine wave voltages 44 and 45 are each simultaneously passing through the zero value, or the so-called "crossover" point. If the negative marker pulse 36' occurs simultaneously with this crossover instant, then the two capacitors 62 and 63 will be discharged by equivalent amounts and there will be a zero difference between the voltages at the two output leads 64 and 65 of the integrator circuit 31. It follows that if the negative marker pulse 36' occurs at a crossover instant of the two sine waves 44 and 45, a zero voltage difference will be fed to the differential amplifier 92. As a further consequence, a signal having no change in voltage value will be delivered by the differential amplifier 92 to the delay gate generator 8, and there will be no effect upon the duration of the delay gate pulse 11, or on the time of occurrence of the trailing edge 12 thereof. If, however, on the other hand, the negative marker pulse 36' occurs at any other instant but the aforementioned crossover instant, a signal will be delivered to the delay gate generator 8 and cause that generator to produce an output pulse 11 of greater or lesser time duration having a relatively earlier or later trailing edge 12.

Returning now to Fig. 1, the operation of the system should become clearly apparent. The signal produced by the integrator 31 will cause the delay gate generator 8 to produce an output pulse 11 of greater or lesser duration, thereby causing the pulse 13 produced by the narrow gate generator 9 to occur earlier or later with respect to the main sweep on the indicator 5. The trailing edge 12 of the pulse 11 will be moved in that direction necessary to cause the pulse 13 of the narrow gate generator 9 to illuminate the cathode ray tube 15 for the desired target being followed by the fiduciary mark 39. The trailing edge 12 continues to move until the negative marker pulse 36' has arrived at a point along the sine waves 44 and 45 as illustrated in Fig. 5, simultaneous with a crossover instant of those sine waves. Thereafter, further alteration of the duration of the pulse 11 of the delay gate generator 8 will cease. Thus, as the rotatable plates 29 of the phase shifting capacitor 22 are turned, thereby changing the instant of a cross over point of the sine waves 44 and 45, so will the trailing edge 12 of the delay gate generator 8 follow the rotation of these plates 29. Simultaneously the positive marker pulse 35 applied to the indicator 5 will move along the sweep thereof, indicating substantially the time of start of a circular expanded sweep of only one mile total range apparent upon the face 16 of the cathode ray tube 15. A target occurring in that one mile portion of the main sweep will be correspondingly enlarged on the circular sweep and more easily examined.

Thus, in order to examine a target presented in non-enlarged size on the main sweep of the indicator 5, the operator will rotate the disc 38 until the positive marker pulse 35 has moved along the sweep of the indicator 5 and approached or touched the target sought to be investigated. Simultaneously that target will appear upon the circular sweep of the cathode ray tube 15. Since a substantially three microsecond delay has been introduced in the occurrence of the positive marker pulse 35 by means of the delay line 32, the marker pulse will occur after the circular sweep has started. This permits the sweep to be started before the target to be investigated is placed thereon, and prevents the occurrence of a target pip before the sweep has started which might happen if the sweep were started too late. The operator then brings the fiduciary mark 39 to the target apparent upon the circular sweep and reads the range to that target from the counter 99.

Figure 3:
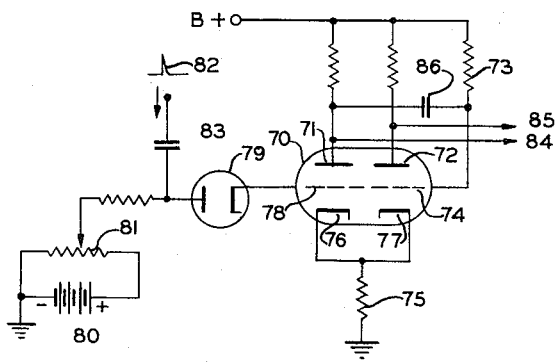
Fig. 3 illustrates a typical delay gate generator that may be used in the apparatus of Fig. 1.

The circuit of our invention may be better understood if a typical delay gate generator 8 is explained. Fig. 3 illustrates a delay gate generator that may be used in the circuit of my invention. An electron tube 70, which may be of the double triode variety, is in a one shot multivibrator circuit. A source of positive voltage B+ is connected to each of the anodes 71 and 72, respectively, of the right and left hand halves of this electron tube 70 and also through a suitable resistor 73 to the right-hand grid 74 of that tube. The resistor 73 is preferably of the order of many megohms in order that the grid 74 may not draw sizable current. As a consequence of this connection to the grid 74, the right-hand half of the electron tube 70 is normally conductive. The cathodes 76 and 77 of the electron tube 70 are connected together and to ground through a common resistor 75. The left-hand grid 78 is connected through a diode 79 to a source of negative voltage 80 which may be varied by means of a potentiometer 81. The left-hand half of the electron tube 70 is normally not conductive. When the right-hand half is conducting, a voltage drop exists in the cathode resistor 75 which places a common positive potential upon the two cathodes 76 and 77. This positive potential upon the left-hand cathode 76 acts further to inhibit the conduction of current through the left-hand half of the electron tube 70.

When the circuit of Fig. 3 is placed in operation, as for example, by a positive trigger pulse 82 being applied through a suitable coupling capacitor 83 to the left-hand grid 78, a rectangular pulse will be produced in the output thereof. If taken from the left-hand anode 71 by means of the left-hand anode lead 84, the output pulse will be negative. If taken from the right-hand anode 72 through the corresponding output lead 85, the output pulse will be positive. The duration of the output pulse is controlled by the size of the capacitor 86 connected between the left-hand anode 71 and the right-hand grid 74, or by the initial potential on the left-hand grid 78, among other factors. As illustrated in Fig. 3, this one shot multivibrator is arranged to have variable potential upon the left-hand grid 78. The effect of varying this potential will be to vary the time duration of the output pulse of the circuit. Further information about the circuit of Fig. 3 may be had by consulting the application of Britton Chance, Serial No. 512,931, filed Dec. 4, 1943 for a "Pulse Generating Circuit," now U. S. Patent 2,562,660 issued July 31, 1951.

As applied to the circuit of our invention, the one shot multivibrator of Fig. 3 has the output of the differential amplifier 92 used as a controlling voltage for the left-hand grid 78 in place of the fixed voltage supply 80 illustrated in Fig. 3. The trigger pulse 6' of my apparatus takes the place of the trigger pulse 82 of Fig. 3. Thus when the differential amplifier 92 is changing the voltage upon the left-hand grid 78 the pulse produced by the circuit of Fig. 3 will become greater or lesser in duration as appropriate, that is, the pulse produced by the delay gate generator 8 is controlled in time duration by the signal output of the differential amplifier 92, as hereinabove set forth.

It may be apparent that in the event of a power failure while the apparatus of our invention is operating, the mere process of reestablishing power will not guarantee that the rotatable capacitor 29 will come to rest upon the same cycle of phase shifted sine wave near which it was working when the power failed. The reason for this is, the sine wave output 19 of the sine wave oscillator 18 is a series of identical sine waves, and it is necessary that the operator know on which cycle he is working in order that the counter 99 will read correctly. It is appropriate, therefore, that a zero setting device 93 be furnished. Such a zero setting device 93 has only to interrupt the signal from the differential amplifier 92 and apply a signal of known and constant voltage to the left hand grid 78 of the apparatus of Fig. 3. Thereupon, the output pulse of that apparatus, which corresponds to the output pulse 11 of the delay gate generator 8, will become a pulse of known and fixed duration. This duration being known, the operator need merely to press an appropriate zero setting button and turn the rotatable disc 38 until the proper range number appears on the counter 99, whereupon the zero setting apparatus 93 may be disengaged and normal operation may be resumed. Such zero setting apparatus 93, while not part of our invention, will facilitate the operation and guarantee the certainty of range reading of the device.

It will be apparent that the frequency of the sine wave oscillator 18 and the duration of the narrow rectangular pulse 13 produced by the narrow gate generator 9 need not be respectively 82 kc. and 12.3 microseconds. These values are merely exemplary and to a high degree useful. However, other values may be used if desired. Therefore it is not intended that the embodiment of our invention illustrated hereinabove be considered the only manner in which our invention may be practiced. It is rather to be understood that our invention is only to be limited by the scope of the prior art and the spirit of the appended claims.

We claim:

1. In a radio echo detection system having a radio receiver and means for indicating the location of objects about said system, range measuring apparatus comprising a gate voltage generator for producing a gate voltage of fixed relatively long duration, a first one-shot multivibrator for producing a rectangular pulse of variable time duration but always shorter than said gate voltage, initial means for triggering said multivibrator and gate voltage generator into operation simultaneously with the initiation of a duty cycle of said system, a second one-shot multivibrator for producing a positive pulse of fixed relatively short duration, said second multivibrator being triggered into action by the trailing edge of the pulse of said first multivibrator, a cathode ray tube having an intensifier grid, deflection plates, and a centrally disposed electrode, the output of said second multivibrator being connected to said intensifier grid, a blocking oscillator for producing simultaneously one positive and one negative relatively very narrow marker pulses when triggered, said oscillator being triggered into action by the leading edge of the pulse of said second multivibrator, said positive marker pulse being fed to said indicating means to produce an indication thereon, a fixed frequency sine-wave oscillator, said sine-wave oscillator being triggered into action by the leading edge of said gate voltage and remaining in operation for the duration of said gate voltage, phase shifting and phase splitting circuits for producing from the output of said sine wave oscillator a symmetrical four phase sine wave output, a phase shifting capacitor having four sets of stator plates arranged in physical quadrature substantially in a circle and one set of rotor plates arranged rotatably in the center of said circle, each phase of said last-mentioned output being fed in parallel to one of said cathode ray tube deflector plates and to one of said sets of stator plates, said deflection plates and sets of stator plates being fed in phase symmetry, a circular sweep being produced on the face of said cathode ray tube and said rotor plates thereby having therein a sine wave voltage of variable phase with relation to the output of said sine wave oscillator output, said variable phase being determined by the angular position of said rotor plates with respect to said sets of stator plates, a phase inverter for splitting said variable phase voltage into first and second variable phase voltages substantially mutually 180° out of phase, an integrator circuit comprising at least two triode electron tubes, said first and second variable phase voltages being fed simultaneously to said integrator circuit, said negative narrow marker pulse being delayed by a time substantially equal to its own length with respect to said positive marker pulse and said positive and negative marker pulses being fed in succession to said integrator circuit, said integrator circuit producing a pair of output voltages the difference between which has a direction and intensity dependent upon the time relationship existing between said negative marker pulse and a common zero voltage instant of said first and second variable phase sine wave voltages, said difference being reduced to zero when said negative marker pulse and said instant are simultaneous, a differential amplifier for said pair of output voltages, the output of said differential amplifier being fed to said first multivibrator and adapted to vary the length of the output pulse thereof in that direction that will displace said negative marker pulse toward said zero voltage instant, the output of said receiver being connected to said centrally disposed electrode of said cathode ray tube to produce echo signals on said circular sweep, and means associated with said rotor plates for orienting said plates in accordance with the position of an echo on said circular sweep and for reading the range between said echo and said system.

2. An occurrence time comparator circuit comprising first and second electron tubes each having a cathode, an anode, and a grid, said cathodes being connected together and through a resistor to ground, said grids being negatively biased to maintain said tubes quiescently non-conductive, and said anodes having quiescently no voltage applied thereto, a first charging capacitor connected from said first anode to ground, and a second charging capacitor connected from said second anode to ground, said first and second grids each having applied thereto first and second sinusoidally varying voltages mutually substantially 180° out of phase and of substantially the same peak to peak amplitude, means for applying a relatively narrow positive voltage pulse to said anodes in parallel to charge said first and second capacitors substantially equally, and means for applying a similar immediately subsequently occurring negative voltage pulse to said cathodes in parallel to render said electron tubes conductive and thereby to discharge said first and second capacitors, the conductivity of each of said tubes and discharges of said first and second capacitors being thereupon regulated by the then-existing values of the first and second sinusoidal voltages at the respective grids of said tubes, said first and second capacitors being discharged by equal amounts when said negative pulse occurs at the instant when said first and second sinusoidal voltages are simultaneously substantially equal and by unequal amounts at other times, whereby the magnitude and direction of the difference between the potentials on said anodes at the time of termination of said negative voltage pulse is determined by the time difference between said instant and the occurrence of said negative voltage pulse and said magnitude is substantially equal to zero when said instant and occurrence are substantially simultaneous.

3. An expanded scale indicator for range measurement in a radio echo detection system having a full range indicator for presenting echoes from targets lying within substantially the entire operating range of said system, comprising a cathode ray beam indicator tube, means for applying sine wave voltages in symmetrical phase quadrature, to said tube to cause the electron beam of said tube to trace a circular path, means for applying a voltage pulse having a duration time equivalent to a predetermined expanded range to bias said tube to cause the trace of said beam to become visible at a controlled time of occurrence for the duration of said pulse, means for applying target echo pulses to said tube to deflect said beam, a rotatable transparent disk adapted for support over said tube and bearing a reference marker for alignment with said target echo pulse deflection, a counter for providing a numerical reading of range, a phase shifter, means for applying said sine wave voltages in phase quadrature to said phase shifter, means for mechanically connecting said disk to said counter and said phase shifter whereby the shift in phase introduced by said phase shifter and the reading of said counter are proportional to the rotation of said disk, means responsive to the phase of said phase shifted sine wave and the time of occurrence of said voltage pulse to control said time of occurrence, means responsive to said voltage pulse for generating a marker pulse, and means applying said marker pulse to said full range indicator to display the time of occurrence of said expanded range.

4. An expanded scale indicator for range measurement in a radio echo detection system having a full range indicator for presenting echoes from targets lying within substantially the entire operating range of said system, comprising a cathode ray tube having at least an intensifier grid, deflection plates, a centrally disposed electrode, a fluorescent screen and an electron beam source, means for generating sine wave voltages in symmetrical phase quadrature, means for applying said sine wave voltages to said deflection plates to cause said beam to trace a circular path each cycle of which represents a predetermined expanded range, a generator of voltage pulses having a controlled time of occurrence and a duration time equivalent to one cycle of said beam, means for applying said pulse to said intensifier grid to cause said electron beam to become visible on said screen for the duration of said pulse, means for applying target echo pulses to said electrode to cause a deflection of said beam, a rotatable transparent disk adapted for support over the screen of said tube and bearing a reference marker for alignment with said target echo pulse deflection, a counter for providing a numerical reading of range, a capacitor type phase shifter, means for applying said sine wave voltages in phase quadrature to said phase shifter, means for mechanically coupling said rotatable disk to said counter and said phase shifter whereby the reading of said counter and the shift in phase introduced by said phase shifter are proportional to the rotation of said disk, means responsive to the phase of said phase shifted sine wave and the time of occurrence of said voltage pulse for controlling the time of occurrence of said voltage pulse, means responsive to said voltage pulse for generating a marker pulse, and means applying said marker pulse to said full range indicator to display the time of occurrence of said expanded range.

5. An expanded scale indicator for range measurement for a radio echo detection system having a full scale range indicator, comprising a cathode ray beam indicator tube, means for applying sweep voltages to said tube to cause said beam to trace a circular path, means for applying target echo pulses to said tube to deflect said beam from said path, a source of timing pulses, a circuit responsive to a timing pulse from said source to produce an output voltage pulse having a time duration equivalent to said expanded scale and delayed in time after said signal by a variable time interval controllable in accordance with the amplitude of an adjustable applied voltage, a sine wave generator adapted to operate under the control of signals from said source, an adjustable phase shifter energized from the output of said sine wave generator to provide a phase shifted sine wave output voltage having voltage nodes adjustable for time of occurrence, means to derive a control voltage having amplitude and polarity variable in accordance with the difference in time of occurrence of said voltage pulse and the time of occurrence of a voltage node of said phase shifted sine wave, means to apply said control voltage to said circuit to adjust said time interval, means for applying said controlled time interval voltage pulse to said tube to cause the trace of said beam to become visible for the time duration of said pulse, means responsive to said voltage pulse to generate a marker pulse, means for applying said marker pulse to said full scale range indicator to display the time of occurrence of said expanded range scale, means for indicating the adjustment of said phase shifter as a measurement of range, and means to adjust said phase shifter in accordance with the appearance of said target echo pulse deflection.

6. An expanded scale range measuring indicator for a radio echo object detection system comprising a source of timing pulses, a multivibrator circuit responsive to a timing pulse from said source to produce an output voltage wave having a time duration controllable in accordance with an adjustable applied control voltage, means for producing a voltage pulse having a duration time equivalent to a predetermined expanded range scale at the termination of said voltage wave, a sine wave generator adapted to operate under control of timing pulses from said source, means energized from said generator to produce sine wave voltages in symmetrical phase quadrature, an adjustable phase shifter, means for applying sine waves in phase quadrature to energize said phase shifter to provide a phase shifted sine wave output voltage having voltage nodes adjustable for time of occurrence, means to derive a control voltage having amplitude and polarity variable in accordance with the difference in time of occurrence of said voltage pulse and the time of occurrence of a selected voltage node of said phase shifted sine wave, means to apply said control voltage to said multivibrator circuit to adjust the time duration of said voltage wave, a cathode ray beam indicator tube, means for applying said sine voltages in phase quadrature to said tube to cause said beam to trace a circular path, means for applying echo signals to said tube to deflect said beam from said path, means for applying said voltage pulse to said tube to cause the trace of said beam to become visible for the time duration of said pulse, means to adjust said phase shifter in accordance with the appearance of said echo signal deflection, and means to indicate the phase shifter adjustment as a measurement of range.

7. A control circuit for an expanded scale range indicator for a radio echo detection system comprising a source of timing pulses, a multivibrator circuit responsive to a timing pulse from said source to produce an output voltage wave having a time duration controllable in accordance with an adjustable applied control voltage, means for producing a voltage pulse having a duration time equivalent to a predetermined expanded range scale at the termination of said voltage wave, a sine wave generator adapted to operate under the control of timing pulses from said source, means energized from said generator to produce sine wave voltages in symmetrical phase quadrature, an adjustable phase shifter, means for applying said quadrature sine waves to energize said phase shifter to provide a phase shifted sine wave output voltage having voltage nodes adjustable for time of occurrence, means to derive a control voltage having amplitude and polarity variable in accordance with the difference in times of occurrence of said voltage pulse and a selected voltage node of said phase shifted sine wave, means to apply said control voltage to said multivibrator circuit to adjust the time duration of said voltage wave, and an indicator for showing the adjustment of said phase shifter.

References Cited in the file of this patent

UNITED STATES PATENTS

| | | |
|---|---|---|
| 2,406,316 | Blumlein et al. | Aug. 27, 1946 |
| 2,407,198 | Wolff | Sept. 3, 1946 |
| 2,407,294 | Shockley et al. | Sept. 10, 1946 |
| 2,416,088 | Deerhake | Feb. 18, 1947 |
| 2,454,782 | De Rosa | Nov. 30, 1948 |
| 2,471,408 | Busignies | May 31, 1949 |

FOREIGN PATENTS

| | | |
|---|---|---|
| 552,072 | Great Britain | Mar. 22, 1943 |